United States Patent [19] — Shiromatsu et al.

[11] Patent Number: 4,814,130
[45] Date of Patent: Mar. 21, 1989

[54] METHOD OF MANUFACTURING EXTRUDED PRODUCT OF FIRE-RETARDANT CROSSLINKED POLYOLEFIN COMPOSITION

[75] Inventors: Eiji Shiromatsu; Kenichi Ohtani, both of Hiratsuka, Japan

[73] Assignee: The Furukawa Electric Co., Ltd., Tokyo, Japan

[21] Appl. No.: 65,268

[22] Filed: Jun. 22, 1987

[30] Foreign Application Priority Data

Jun. 24, 1986 [JP] Japan ................. 61-146133

[51] Int. Cl.$^4$ ............................................. B29C 47/78
[52] U.S. Cl. ........................ 264/83; 264/174; 264/209.6; 264/211.24; 264/236; 264/237; 264/347; 264/348
[58] Field of Search ............... 264/236, 83, 347, 349, 264/237, 348, 209.6, 174, 211.24

[56] References Cited

U.S. PATENT DOCUMENTS

| | | | |
|---|---|---|---|
| 4,117,063 | 9/1978 | Voigt et al. | 264/349 |
| 4,117,195 | 9/1978 | Swarbrick et al. | 264/347 |
| 4,228,255 | 10/1980 | Fujimoto et al. | 264/211.24 |
| 4,444,948 | 4/1984 | Hochstrasser et al. | 264/209.6 |
| 4,489,029 | 12/1984 | Keogh et al. | 264/174 |
| 4,514,539 | 4/1985 | Hattrich et al. | 264/174 |
| 4,564,349 | 1/1986 | Brown | 425/207 |
| 4,595,546 | 6/1986 | Wheeler, Jr. | 264/174 |
| 4,716,000 | 12/1987 | Kerschbaum et al. | 264/347 |

FOREIGN PATENT DOCUMENTS

| | | |
|---|---|---|
| 179755A2 | 4/1986 | European Pat. Off. |
| 53-8668 | 1/1978 | Japan |
| 57-84828 | 5/1982 | Japan |

Primary Examiner—Jeffery Thurlow
Attorney, Agent, or Firm—Frishauf, Holtz, Goodman & Woodward

[57] ABSTRACT

In a method of manufacturing an extruded product of a fire-retardant crosslinked polyolefin composition, including the steps of mixing 10 to 200 parts by weight of at least one material selected from the group consisting of an inorganic fire retardant, an organic fire retardant, and an inorganic filler to 100 parts by weight of polyolefin, adding predetermined amounts of an unsaturated alkoxysilane and a radical polymerization initiator to the resultant mixture to cause silicone grafting, and bringing a reacted mixture into contact with water in the presence of a silanol condensation catalyst, a cooling zone is formed between an extruder and a crosshead to set a uniform temperature of a molten resin composition and to cool the composition temperature to a desired temperature.

13 Claims, 5 Drawing Sheets

METHOD OF MANUFACTURING EXTRUDED PRODUCT OF FIRE-RETARDANT CROSSLINKED POLYOLEFIN COMPOSITION

BACKGROUND OF THE INVENTION

The present invention relates to a method of manufacturing an extruded product of a fire-retardant silane crosslinked polyolefin composition and, more particularly, to a method of manufacturing an extruded product (e.g., a fire-retardant crosslinked polyolefin insulated wire) of a fire-retardant crosslinked polyolefin composition by silicone grafting.

According to a known method of manufacturing an extruded product, a polyolefin polymer such as polyethylene, vinyltrimethoxysilane and a graft reaction agent (e.g., a radical polymerization initiator) are heated under given conditions and are reacted with each other to obtain silyl-denatured polyolefin. The resultant silyl-denatured polyolefin is reacted with water in the presence of a silanol condensation catalyst to prepare a crosslinked polyolefin extruded product.

However, conventional extrusion molding has the following disadvantages:

(a) Polyolefin and a graft reaction agent are kneaded and extruded to prepare a crosslinkable graft polymer. This polymer is heated, kneaded, and extruded with a masterbatch of a silanol condensation catalyst (e.g., dibutyldilaurate) and a filler to prepare such a crosslinked polyolefin product. However, according to this method, i.e., a method essentially consisting of two steps, the crosslinkable graft polymer and the masterbatch must be controlled to be isolated from a small amount of moisture. In practice, this control is very difficult. The two-step method results in high cost. In particular, a composition prepared by adding a filler tends to absorb moisture. The masterbatch of the filler and the silanol condensation catalyst must be sufficiently dried (e.g., in air at 80° C. for 48 hours or more) prior to extrusion, thereby prolonging the fabrication schedule.

(b) In order to solve the above problem of the two-step method, polyolefin, unsaturated alkoxysilane, a graft reaction agent, and a masterbatch of a silanol condensation catalyst and a filler are mixed in an extruder. The resultant mixture is heated and extruded to obtain an extruded product, thus achieving a one-step method. According to one-step method, after the various components are mixed to obtain a compound, the compound is supplied from an extruder hopper. An unsaturated alkoxysilane (e.g., vinyltrimethoxy silane (VTMOS)) and a radical polymerization initiator (e.g., an organic peroxide such as dicumylperoxide (DCP)) are filled in the extruder. At first, the unsaturated alkoxysilane must be graft-polymerized with the polymer. For this purpose, a radical polymerization initiator (e.g., an organic peroxide such as DCP) must be decomposed within a short period of time (i.e., within one minute). Therefore, an extruder temperature must be set to 160° to 220° C. and a molten resin temperature must be set to 190° to 230° C. However, when the molten resin is extruded in air from the die port, the unreacted silane component and other volatile components serve as a bubble source. Voids are often formed in an extruded product before the extruded product is cooled. In particular, a composite fire-retardant silane crosslinked composition containing a large amount of an inorganic fire retardant (e.g., a metal hydroxide), an organic fire retardant (e.g., DBDE (decabromodiphenyl ether)), or an inorganic filler (e.g., calcium carbonate) is extruded according to a one-step method, grafting efficiency of the unsaturated alkoxysilane is degraded and shearing exothermic heat is increased (i.e., the viscosity of the composite composition is increased), thus causing generation of bubbles. Therefore, the composite fire-retardant silane crosslinked composition must be extruded according to the two-step method or a compression cooling unit must be used to increase the fabrication cost as well as installation cost.

In order to solve the above problem, the present inventors made extensive studies on (a) an application of a vent extruder, (b) improvement of grafting efficiency and dispersion by using a mixing screw, (c) an application of an unsaturated alkoxysilane compound having a high boiling point (e.g., vinyltris($\beta$-methoxyethoxy)silane having a b.p. (boiling point) of 285° C. and vinyltriethoxysilane having a b.p. of 160° C.), and (d) a change in temperature profile. Bubble generation could be effectively inhibited by a vent extruder in item (a). However, the extruder required modification and was disadvantageous in installation cost. Grafting efficiency and dispersion were evaluated using a fluted mixing screw (Maddock type) and a Maillefer type mixing screw as a mixing screw in item (b). However, the bubbles could not be completely inhibited. The necessary degree of crosslinking could be obtained by using an unsaturated alkoxy silane having a high boiling point as in item (c). However, there was many working limitations and generation of bubbles could not be inhibited.

SUMMARY OF THE INVENTION

The present inventors lowered the temperature of a molten resin composition undergone silane grafting, to a value at which no bubbles were generated in the molten composition and the composition was in a extrudable condition. Then, they extruded the molten resin composition, thereby forming products. These products were found to have a high degree of crosslinking and to have no bubbles.

According to the present inventors, various cooling zones were tken into consideration. The present inventors concluded that a cooling zone having a stirring temperature was required. More specifically, the cooling zone having the stirring function was exemplified by a static mixing stirrer, an extruder, a gear pump, and the like. Examples of the static mixing stirrer are a static mixer available from Kenix Japan, a static mixer available from Noritake Co., a nondrive mixer (e.g., an ISG mixer and an LPD mixer) available from Tokushu Kika Kogyo K.K., a Shimazaki pipe mixer available from Koritsu Sangyo K.K., a square mixer available from K.K. Sakura Seisakusho, a honeycomb mixer available from Tomoe Kogyo K.K., high mixers, and static mixing units. These devices are designed to divided a continuous flow into several portions and continuously mix the divided portions by changing combinations of the dividing planes. Therefore, the temperature of the molten resin composition can be uniformly decreased. In addition, an extruder, a gear pump and the like were found to be effective for uniformly cooling the resin composition.

It is, therefore, an object of the present invention to provide an easy, low-cost method of manufacturing an extruded product at a high grafting rate according to a one-step method without causing generation of bubbles, the extruded product being prepared using a fire-retardant composition of a type normally subjected to generation of bubbles when it is extruded by the one-step method.

In order to achieve the above object of the present invention, there is provided a method of manufacturing an extruded product of a fire-retardant crosslinked polyolefin composition, wherein 10 to 200 parts by weight of at least one material selected from the group consisting of an inorganic fire retardant, an organic fire retardant, and an inorganic filler are mixed with 100 parts by weight of polyolefin, and desired amounts of an unsaturated alkoxysilane and a radical polymerization initiator are added to the above mixture to cause silicone grafting and are brought into contact with moisture and crosslinked in the presence of a silanol condensation catalyst, characterized in that a desired cooling zone is formed between an extruder and a crosshead to set a uniform temperature of a kneaded resin composition in a molten state, and the composition temperature is cooled to a desired temperature, and preferably to 100° to 170° C.

DETAILED DESCRIPTION OF THE PREFERRED EMBODIMENTS

Figure 1:
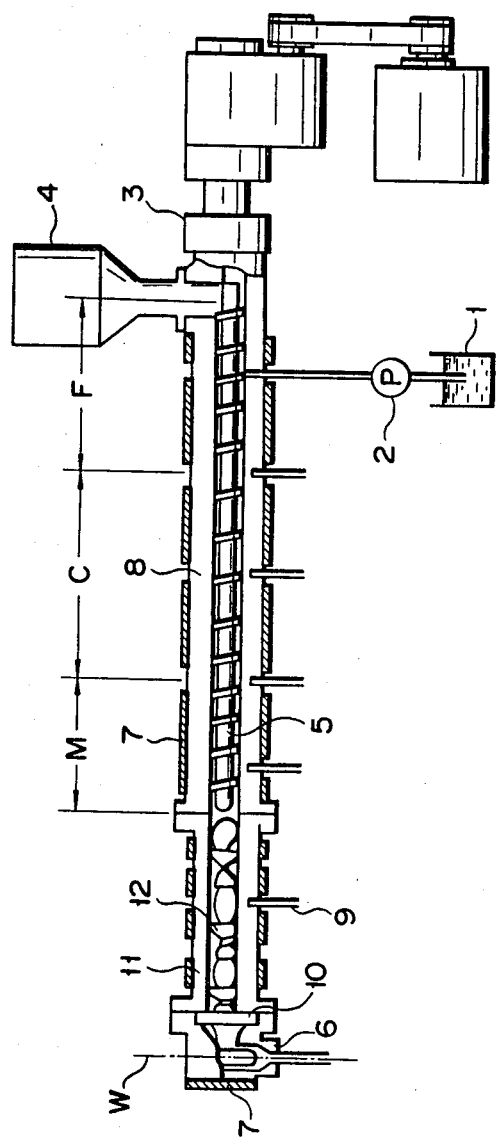
FIGS. 1 to 3 are views for explaining an extruder used in a method of the present invention.

A polyolefin according to the present invention is defined as a polyolefin or a polymer containing a polyolefin and is at least one polymer selected from the group consisting of high-pressure low-density polyethylene, medium/low-pressure high-density polyethylene, low-pressure low-density polyethylene, medium-density polyethylene, an ethylene-α-olefin copolymer, polypropylene, an ethylene-ethyl acrylate copolymer, an ethylene-vinyl acetate copolymer, an ethylene-propylene copolymer, an ethylene-propylene-diene terpolymer, an ethylene-butene copolymer, polymethylpentane-1, polybutene, chlorinated polyethylene, and an ethylene-vinyl acetate-chlorine terpolymer.

An inorganic fire retardant according to the present invention is at least one fire retardant selected from the group consisting of antimony trioxide, aluminum hydroxide, magnesium hydroxide, zinc borate, red phosphorus, sodium antimonate, ammonium primary phosphate, ammonium secondary phosphate, ammonium bromide, ammonium borate, and ammonium sulfamate.

Examples of an organic flow retardant according to the present invention are an alkyl phosphoric ester, a halogen acid-containing ester, an acidic phosphoric ester, a nitrogen-containing phosphorus compound, and a polymerizable phosphorus compound monomer. Examples of the alkyl phosphoric ester are trimethylphosphate and triethylphosphate. Examples of the halogen acid-containing ester are tris(chloroethyl)phosphate and tris(2,3-dibromopropyl)phosphate.

Examples of the halogen-based organic fire retardant are chlorinated paraffin, chlorinated polyolefin, brominated polyphenyldecabromodiphenyl ether, hexabromocyclododecane, perchloropentacyclodecane (Dechlorone Plus), and tetrabromobisphenol A.

The inorganic filler used in the present invention is at least one material selected from the group consisting of all silicate minerals (e.g., baked clay, kaoline clay, an aluminum silicate glass powder, and a glass fiber), calcium carbonate, talk, and water-containing magnesium silicate.

The unsaturated alkoxysilane used in the present invention is represented by general formula $RR'SiY_2$ wherein R is an olefinic unsaturated group having a valency of 1 and containing carbon, hydrogen and oxygen atoms. Examples of the unsaturated alkoxysilane are vinyl, allyl, butenyl, cyclohexenyl, cyclopentadienyl, cyclohexadienyl, $CH_2=C(CH_3)COO(CH_2)_3-$, $CH_2=C(CH_3)COOCH_2CH_2O(CH_2)_3-$, and $CH_2=C(CH_3)COOCH_2CH_2OCH_2CHCH_2O(CH_2)_3-$.
In the above formula, Y is a hydrolyzable organic group such as an alkoxy group (e.g., a methoxy group, an ethoxy group, and a butoxy group), an acyloxy group (e.g., a formyloxy group, an acetoxy group, an a propionoxy group), an oxymo group (e.g., $-ON=C(CH_3)_2$, $-ON=C(CH_3)C_2H_5$, and $-ON=C(C_6H_5)_2$, and a substituted amino group (e.g., an alkyl amino and aryl amino groups such as $-NHCH_3$, $-NHC_2H_5$, and $NH(C_6H_5)$. The same or different substituted groups Y may be used in the given silane molecules. In the above general formula R' is a hydrocarbon group having a valency of 1 and not containing an unsaturated aliphatic group and is exemplified by methyl, ethyl, propyl, tetradecyl, octadecyl, phenyl, benzyl or tryl. Group R' may be group Y.

The unsaturated alkoxysilane is preferably represented by general formula $RSiY_3$ (wherein R is a vinyl group). Examples of the unsaturated alkoxysilane are vinyl triethoxysilane and vinyl trimethoxysilane.

The radical polymerization initiator is a compound which causes generation of radicals in polyolefin under reactive conditions. This compound has half-life of 6 minutes or less and preferably one minute or less at the reaction temperature.

Examples of the best known and preferable free radical formation compound are organic peroxides and peresters (e.g., benzoyl peroxide, dichlorobenzoyl peroxide, dicumyl peroxide, di-tert-butyl peroxide, 2,5-dimethyl-2,5-di(peroxybenzoate)hexyne-3, 1,3-bis(t-butylperoxyisopropyl)benzene, lauroyl peroxide, tert-butyl peracetate, 2,5-dimethyl-2,5-di(t-butylperoxy)-hexyne, 2,5-dimethyl-2,5-di(t-butylperoxy)hexane, and tert-butylperbenzoate) and azo compounds (e.g., azobisisobutylnitrile and dimethylazodiisobutylate).

The silanol condensation catalyst used in the present invention is metal salts of carboxylic acid and its examples are dibutyl tin dilaurylate, dibutyl tin diacetate, dibutyl tin dioctoate, stannous acetate, stannous caprylate, lead naphthenate, zinc caprylate, 2-ethyl ferrous caprylate, and cobalt naphthenate. The silanol condensation catalyst may also be an organic metal compound such as titanium ester or chelate (e.g., tetrabutyltitanate, tetranonyltitanate, bis(acetylacetonyl)-di-isopropyltitanate); an organic base (e.g., ethylamine, hexylamine, dibutylamine, and piperidine); and an acid (e.g., a mineral acid and fatty acid).

It should be noted that the silanol condensation catalyst can be addd together with an unsaturated alkoxysilane and a radical formation agent. In addition, the silanol condensation catalyst may be coated on the surface of the extruded product or dispersed in water as an emulsion type.

Various types of components such as an antioxidant, a metal inhibitor, an ultraviolet absorber, and a colorant may be used so as not to impair the effect of the present invention in the fabrication of an extruded product of a fire-retardant crosslinked polyolefin composition.

In the present invention, a static mixer/stirrer as cooling equipment in a cooling zone is used or a means such as an extruder or a gear pump is used to stir and cool the molten resin composition to control its temperature.

According to the present invention, polyolefin pellets and a compound of a filler (e.g., a fire retardant) and a silanol condensation catalyst are supplied from a hopper of the extruder. An unsaturated alkoxysilane and a graft reaction agent (e.g., an organic peroxide) are measured in predetermined amounts and are supplied from the lower portion of the hopper by an injection pump into an extruder cylinder, thereby causing silicone grafting. At the same time, in the silane one-step method, a cooling zone is provided between an extruder and a crosshead to set a uniform temperature of a molten resin composition and to cool the composition temperature to a desired temperature. Upon completion of silicone grafting, the resin temperature is decreased below the critical temperature (i.e., 170° C. or less) at which bubbles are formed, thereby preparing an extruded product of a fire-retardant polyolefin composition.

COMPARATIVE EXAMPLE 1

The following composition was used in Comparative Example 1.

| Material | Content | Remarks |
| --- | --- | --- |
| EEA (Ethylene-Ethyl acrylate copolymer) | 100 PHR | Nihon Unicar M.I. = 1.5, EA content = 15% |
| Metal Hydrate | 250 | Magnesium hydroxide |
| Fire Retardant | 70 | Phosphorus |
| Antioxidant | 10 | Irganox |
| Silanol Condensation Catalyst | 0.5 | Dibutyl-tin-di-laurylate |
| Total | 430.5 | |

The above composition is used as a fire-retardant-catalyst masterbatch, and test compositions are as follows:

| Material | Content | Remarks |
| --- | --- | --- |
| EEA | 70 PHR | Nihon Unicar M.I. = 1.5, EA content = 15% |
| Fire Retardant-catalyst Masterbatch | 30 | the above table |
| Unsaturated Alkoxysilane | 2 | Vinyltrimethoxysilane |
| Organic Peroxide | 0.15 | Dicumylperoxide |
| Total | 102.15 | |

The mixing rates of the components of the test composition are as is shown in the following table.

| Material | Content |
| --- | --- |
| EEA | 100 PHR |
| Metal Hydrate | 22.6 |
| Fire retardant | 6.4 |
| Antioxidant | 0.9 |
| Silanol Condensation Catalyst | 0.04 |
| Unsaturated Alkoxysilane | 2.6 |
| Organic Peroxide | 0.19 |
| Total | 132.73 PHR |

The EEA pellets and the masterbatch are mixed in a predetermined mixing ratio. The unsaturated alkoxysilane and the organic peroxide are mixed to prepare a liquid mixture. The liquid mixture is injected by a pump into the extruder in accordance with the extrusion rate.

Figure 4:
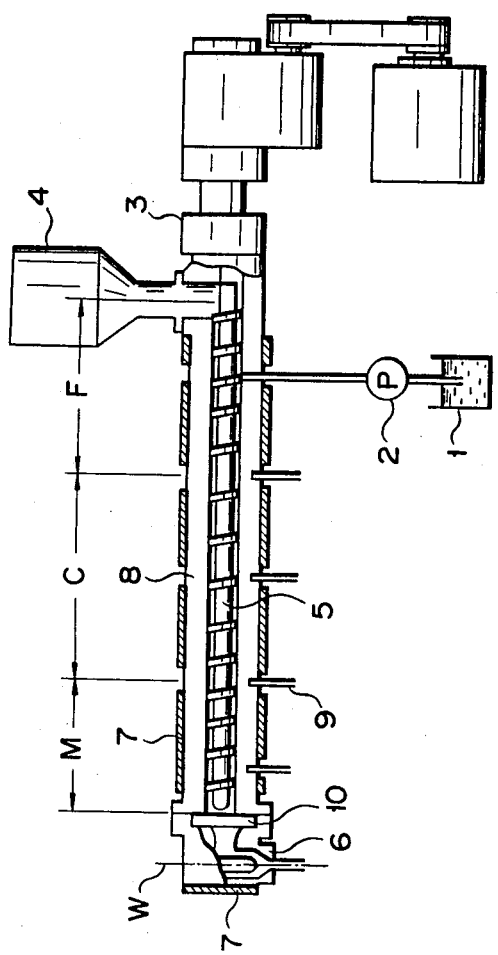
FIGS. 4 and 5 are views for explaining an extruder used in a conventional method.

The extrusion operation will be described in more detail with reference to the accompanying drawings. The polyolefin pellets and a compound (to be referred to as a masterbatch hereinafter) of the fire-retardnant and the silanol condensation catalyst were supplied from hopper 4 of extruder 3 into extruder cylinder 8. Mixture solution 1 of the unsaturated alkoxysilane and the organic peroxide was quantitatively supplied to cylinder 8 by injecting pump 2. In this case, screw 5 of a low compression type having an L/D=20 to 28 and a compression ratio of 2 to 4 was used to sufficiently remove moisture of the pellets, and the catalyst and the fire retardant which did not tend to be dispersed were uniformly kneaded and dispersed. Extruder 3 had a diameter of 55 mm and an L/D of 28. Supply zone F was set as 6 to 8D (where D is the diameter of the extruder), compression zone C was 7 to 8D, and metering zone M was 12 to 15D. Uniform kneading and metering of molten polyolefin were performed. Thereafter, the molten composition was extruded on the circumferential surface of conductor W driven by crosshead 6 mounted at the distal end of extruder 3 (FIG. 4). The extruded wire was exposed to moisture and crosslinked. The extruder comprised thermocouple 9 and heater 7. Temperature control device were performed to control the temperature of extruder 3 with a given temperature gradient. Screw 5 may be a fullflight screw or any other mixing screw may be used. However, in this example, a fluted mixing screw was used. 40-, 60-, and 80-mesh stainless steel nets were respectively inserted in the corresponding positions in breaker plate 10. The evaluation of the presence/absence of bubbles was performed as follows. A material extruded from the die port was extracted as a hollow pipe having a length of 30 to 40 mm. The hollow pipe was immediately dipped in a water tank. The cross section of the pipe was observed with an eye and a 10X magnifier. Thereafter, the material was concentrically extruded to obtain extruded products each having a thickness of 1.5 mm on a circular compression copper conductor having a diameter of 5.5 mm and a cross-sectional area of 22 mm². The nipple had a diameter of 5.6 mm and the die had a diameter of 8.6 mm. The linear speed in terms of an extrusion rate was calculated to achieve a substantially constant cooling time.

When the cooling zone was not provided, the material was extruded under the following conditions:

| F | C | M | Crosshead C.H. | Die D |
| --- | --- | --- | --- | --- |
| 160° C. | 180° C. | 200° C. | 200° C. | 200° C. |

The extrusion results are summarized in Table 1.

In addition, the material was extruded under the following conditions:

| F | C | M | Crosshead C.H. | Die D |
| --- | --- | --- | --- | --- |
| 120° C. | 140° C. | 160° C. | 160° C. | 160° C. |

The extrusion results are summarized in Table 1.

The bubbles were evaluated by cross sections of pipe- and wire-like extruded products. The gel fraction was the weight of an insoluble component after extraction in xylene at 120° C. for 24 hours. The heat deformation coefficient was measured on the basis of a JIS method when the extruded and crosslinked products were preheated at 120° C. for 30 minutes and loaded with 1.5 kg for 30 minutes. The heat deformation coefficients could be calculated by the following relation:

[{(Outer Diameter Before Deformation) − (Outer Diameter After Deformation)}/(Outer Diameter Before Deformation)] × 100%

The outer appearance was evaluated with a naked eye for the outer surfaces of the extruded electric wires.

As is apparent from Table 1, when the preset temperature of the extruder is increased, a sufficiently high degree of crosslinking (i.e., a high gel fraction) can be obtained, the heat deformation coefficient is small, but a large number of bubbles are formed. However, when the extruder temperature is decreased, the molten resin composition temperature is low, and no bubbles are formed. However, the degree of crosslinking is low (i.e., a low gel fraction) and the heat deformation coefficient is high. In this csase, the resultant products are not practical.

COMPARATIVE EXAMPLE 2

Figure 5:
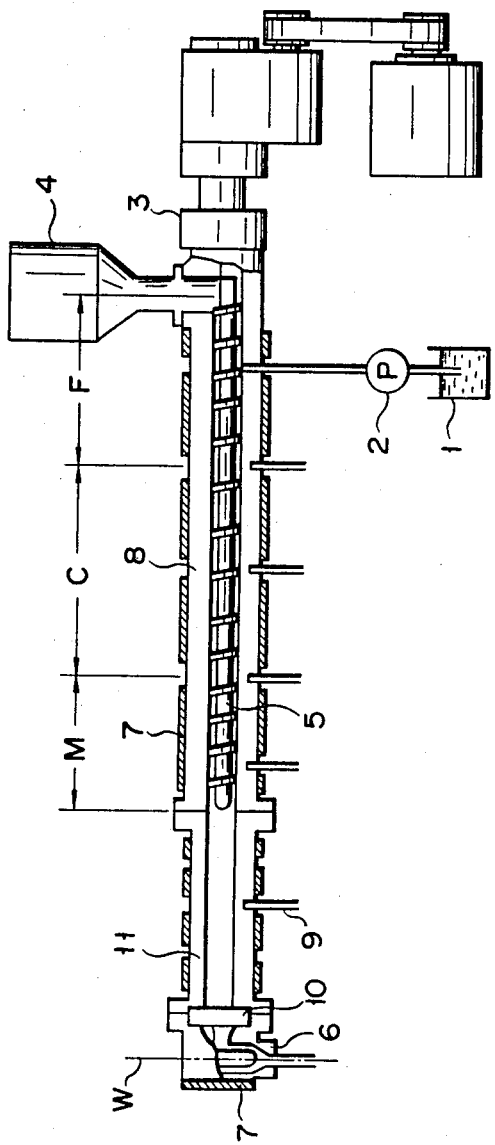

A composition as in Comparative Example 1 was used, and cylinder 11 (having a diameter of 55 mm and an L/D of 9) was connected as a simple cooling zone to extruder 3 (see FIG. 5). The temperature profile of extruder 3 was set as follows:

| F | C | M | C.H. | D |
|---|---|---|---|---|
| 160° C. | 180° C. | 200° C. | 200° C. | 160° C. | 160° C. |

The temperature of the cylinder as the cooling zone was changed in the range of 65° C. to 160° C. The temperature profiles of the crosshead and the die were evaluated at 170° C. and in the temperature range of 100° to 130° C. The resuls are summarized in Table 1. The molten resin composition temperature was not sufficiently decreased.

TABLE 1

| | Comparative Example 1 | | | | | Comparative Example 2 | | | |
|---|---|---|---|---|---|---|---|---|---|
| Extruder Temperature | | | | | | | | | |
| F Zone | 160° C. | 160° C. | 120° C. | 120° C. | 160° C. | 160° C. | 160° C. | 160° C. |
| After C Zone | 180° C. | 180° C. | 140° C. | 140° C. | 180° C. | 180° C. | 180° C. | 180° C. |
| Before C Zone | 200° C. | 200° C. | 160° C. | 160° C. | 200° C. | 200° C. | 200° C. | 200° C. |
| M zone | 200° C. | 200° C. | 160° C. | 160° C. | 200° C. | 200° C. | 200° C. | 200° C. |
| Cooling Zone | | | | | | | | | |
| Structure | None | None | None | None | Cylinder 55φL/D = 9 | 55φL/D = 9 | 55φL/D = 9 | 55φL/D = 9 |
| Temperature | | | | | 65° C. | 65° C. | 160° C. | 160° C. |
| Crosshead Temperature | 200° C. | 200° C. | 140° C. | 140° C. | 170° C. | 170° C. | 170° C. | 170° C. |
| Die Temperature | 200° C. | 200° C. | 140° C. | 140° C. | 170° C. | 170° C. | 170° C. | 170° C. |
| Screw Speed | 20 rpm | 40 rpm | 20 rpm | 40 rpm | 20 rpm | 40 rpm | 20 rpm | 40 rpm |
| Molten Resin Temperature | 186° C. | 194° C. | 158° C. | 165° C. | 176° C. | 183° C. | 180° C. | 186° C. |
| Bubble | Many | Many | None | None | Many | Many | Many | Many |
| Gel Fraction | 70% | 72% | 48% | 47% | 65% | 70% | 69% | 72% |
| Heat Deformation Coefficient | 19% | 15% | 43% | 50% | 22% | 16% | 20% | 13% |
| Outer Appearance | Good | Good | Good | Good | Good | Good | Good | Good |

EXAMPLE 1

Static mixer/stirrer (static mixer having an inner diameter of 38 mm and an L/D of 9) 11 was inserted as a cooling zone between extruder 3 and crosshead 6 (see FIG. 1). A composition as in Comparative Example 1 was used.

The temperature profile of extruder 3 was set as follows:

| F | C | M |
|---|---|---|
| 160° C. | 180° C. | 200° C. | 200° C. |

The temperature of the static mixer was changed in the range of 65° C. to 160° C. The temperature profiles of the crosshesad and the die were evaluated at 170° C. and in the range of 100° to 130° C. The results are summarized in Table 2. As is apparent from Table 2, the molten resin composition temperature can be low enough not to cause generation of bubbles (i.e., 170° C. or less) and the degree of crosslinking is satisfactory.

TABLE 2

| | Example 1 | | | | | | |
|---|---|---|---|---|---|---|---|
| Extruder Temperature | | | | | | | |
| F Zone | 160° C. | 160° C. | 160° C. | 160° C. | 160° C. | 160° C. | 160° C. |
| After C Zone | 180° C. | 180° C. | 180° C. | 180° C. | 180° C. | 180° C. | 180° C. |
| Before C Zone | 200° C. | 200° C. | 200° C. | 200° C. | 200° C. | 200° C. | 200° C. |
| M zone | 200° C. | 200° C. | 200° C. | 200° C. | 200° C. | 200° C. | 200° C. |
| Cooling Zone | | | | | | | |
| Structure | Static mixer/stirrer | Static mixer/stirrer | Static mixer/stirrer | Static mixer/stirrer | Static mixer/stirrer | Static mixer/stirrer | Static mixer/stirrer |

TABLE 2-continued

Example 1

|  | 38φL/D = 9 Six elements | 38φL/D = 9 Six elements | 38φL/D = 9 Six elements | 38φL/D = 9 Six elements | 38φL/D = 9 Six elements | 38φL/D = 9 Six elements | 38φL/D = 9 Six elements |
|---|---|---|---|---|---|---|---|
| Temperature | 160° C. | 160° C. | 140° C. | 140° C. | 120° C. | 120° C. | 120° C. |
| Crosshead Temperature | 170° C. | 170° C. | 170° C. | 170° C. | 170° C. | 170° C. | 130° C. |
| Die Temperature | 170° C. | 170° C. | 170° C. | 170° C. | 170° C. | 170° C. | 130° C. |
| Screw Speed | 20 rpm | 40 rpm | 20 rpm | 40 rpm | 20 rpm | 40 rpm | 20 rpm |
| Molten Resin Temperature | 173° C. | 183° C. | 168° C. | 176° C. | 167° C. | 177° C. | 146° C. |
| Bubble | Little | Many | None | Little | None | Little | None |
| Gel Fraction | 66% | 69% | 70% | 73% | 67% | 68% | 70% |
| Heat Deformation Coefficient | 24% | 20% | 15% | 14% | 20% | 22% | 19% |
| Outer Appearance | Good | Good | Good | Good | Good | Good | Good |
| Extruder Temperature | | | | | | | |
| F Zone | 160° C. | 160° C. | 160° C. | 160° C. | 160° C. | 160° C. | 160° C. |
| After C Zone | 180° C. | 180° C. | 180° C. | 180° C. | 180° C. | 180° C. | 180° C. |
| Before C Zone | 200° C. | 200° C. | 200° C. | 200° C. | 200° C. | 200° C. | 200° C. |
| M Zone | 200° C. | 200° C. | 200° C. | 200° C. | 200° C. | 200° C. | 200° C. |
| Cooling Zone | | | | | | | |
| Structure | Static mixer/stirrer 38φL/D = 9 Six elements | Static mixer/stirrer 38φL/D = 9 Six elements | Static mixer/stirrer 38φL/D = 9 Six elements | Static mixer/stirrer 38φL/D = 9 Six elements | Static mixer/stirrer 38φL/D = 9 Six elements | Static mixer/stirrer 38φL/D = 9 Six elements | Static mixer/stirrer 38φL/D = 9 Six elements |
| Temperature | 120° C. | 100° C. | 100° C. | 80° C. | 80° C. | 65° C. | 65° C. |
| Crosshead Temperature | 130° C. | 130° C. | 130° C. | 120° C. | 120° C. | 100° C. | 100° C. |
| Die Temperature | 130° C. | 130° C. | 130° C. | 120° C. | 120° C. | 100° C. | 100° C. |
| Screw Speed | 40 rpm | 20 rpm | 40 rpm | 20 rpm | 40 rpm | 20 rpm | 40 rpm |
| Molten Resin Temperature | 169° C. | 149° C. | 170° C. | 137° C. | 168° C. | 128° C. | 164° C. |
| Bubble | None | None | None | None | None | None | None |
| Gel Fraction | 65% | 58% | 65% | 74% | 78% | 78% | 72% |
| Heat Deformation Coefficient | 25% | 29% | 26% | 15% | 19% | 15% | 14% |
| Outer Appearance | Good | Good | Good | Good | Good | Good | Good |

EXAMPLE 2

Figure 2:
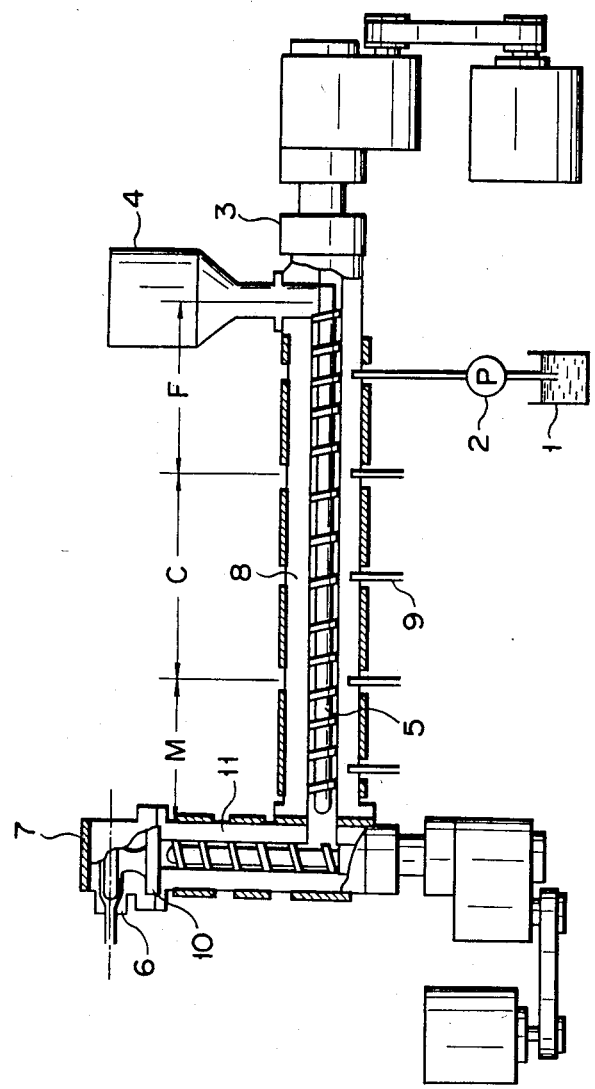

Extruder 11 having a diameter of 55 mm and an L/D of 12 was connected as a cooling zone to extruder 3 (see FIG. 2). A composition as in Comparative Example 1 was used.

The temperature profile of extruder 3 was set as follows:

| F | C | M |
|---|---|---|
| 160° C. | 180° C. | 200° C. | 200° C. |

The temperature of extruder 11 was changed in the range of 65° C. to 160° C. The temperature profiles of the crosshead and the die were evaluated at 170° C. and 130° C. The results are summarized in Table 3. As is apparent from Table 3, the degree of crosslinking is satisfactory and bubbles are not formed in the temperature range of the cooling zone.

TABLE 3

Example 2

|  |  |  |  |  |  |  |
|---|---|---|---|---|---|---|
| Extruder Temperature | | | | | | |
| F Zone | 160° C. | 160° C. | 160° C. | 160° C. | 160° C. | 160° C. |
| After C Zone | 180° C. | 180° C. | 180° C. | 180° C. | 180° C. | 180° C. |
| Before C Zone | 200° C. | 200° C. | 200° C. | 200° C. | 200° C. | 200° C. |
| M zone | 200° C. | 200° C. | 200° C. | 200° C. | 200° C. | 200° C. |
| Cooling Zone | | | | | | |
| Structure | 55φL/D = 12 extruder | 55φL/D = 12 extruder | 55φL/D = 12 extruder | 55φL/D = 12 extruder | 55φL/D = 12 extruder | 55φL/D = 12 extruder |
| Temperature | 160° C. | 160° C. | 120° C. | 120° C. | 65° C. | 65° C. |
| Crosshead Temperature | 170° C. | 170° C. | 170° C. | 170° C. | 170° C. | 170° C. |
| Die Temperature | 170° C. | 170° C. | 170° C. | 170° C. | 170° C. | 170° C. |
| First and Second Extruder Screw Speeds | 20 rpm | 40 rpm | 20 rpm | 40 rpm | 20 rpm | 40 rpm |
| Molten Resin Temperature | 178° C. | 186° C. | 142° C. | 160° C. |  |  |
| Bubble | Many | Many | None | None | Large motor load in second extruder | |
| Gel Fraction | 71% | 70% | 70% | 66% | | |
| Heat Deformation | 20% | 18% | 15% | 24% | | |

TABLE 3-continued

Example 2

| | | | | | | |
|---|---|---|---|---|---|---|
| Coefficient | | | | | | |
| Outer Appearance | Good | Good | Good | Good | | |
| Extruder Temperature | | | | | | |
| F Zone | 160° C. | 160° C. | 160° C. | 160° C. | 160° C. | 160° C. |
| After C Zone | 180° C. | 180° C. | 180° C. | 180° C. | 180° C. | 180° C. |
| Before C Zone | 200° C. | 200° C. | 200° C. | 200° C. | 200° C. | 200° C. |
| M zone | 200° C. | 200° C. | 200° C. | 200° C. | 200° C. | 200° C. |
| Cooling Zone | | | | | | |
| Structure | 55φL/D = 12 extruder | 55φL/D = 12 extruder | 55φL/D = 12 extruder | 55φL/D = 12 extruder | 55φL/D = 12 extruder | 55φL/D = 12 extruder |
| Temperature | 160° C. | 160° C. | 120° C. | 120° C. | 65° C. | 65° C. |
| Crosshead Temperature | 130° C. | 130° C. | 130° C. | 130° C. | 130° C. | 130° C. |
| Die Temperature | 130° C. | 130° C. | 130° C. | 130° C. | 130° C. | 130° C. |
| First and Second Extruder Screw Speeds | 20 rpm | 40 rpm | 20 rpm | 40 rpm | 20 rpm | 40 rpm |
| Molten Resin Temperature | 176° C. | 182° C. | 135° C. | 146° C. | | |
| Bubble | Many | Many | None | None | Large motor load in second extruder | |
| Gel Fraction | 70% | 72% | 68% | 65% | | |
| Heat Deformation Coefficient | 17% | 15% | 23% | 20% | | |
| Outer Appearance | Good | Good | Good | Good | | |

EXAMPLE 3

Figure 3:
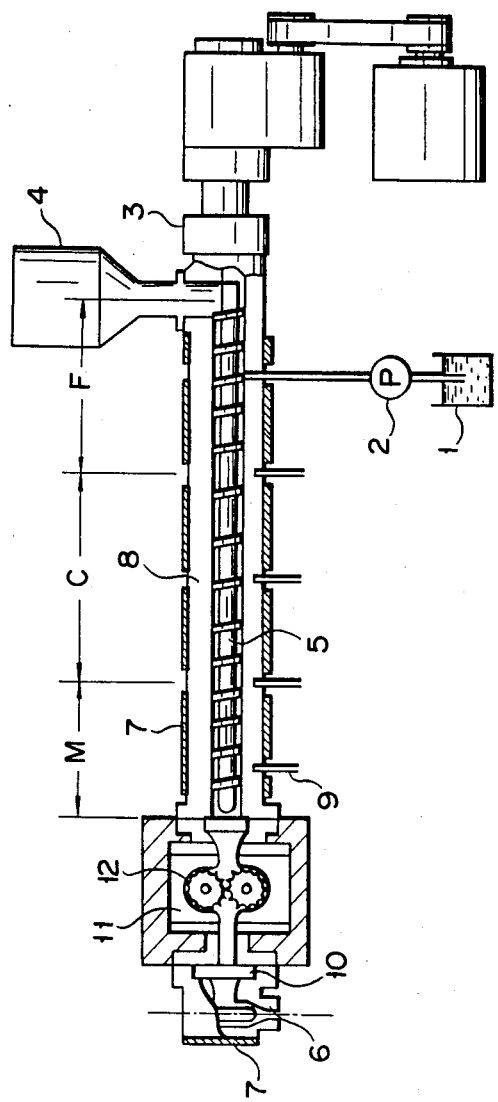

A composition as in Comparative Example 1 was used. 100 cc/rev straight gear pump 11 was connected as a cooling zone to extruder 3 (see FIG. 3). Reference numeral 12 in FIG. 3 denotes gears. The temperature profile of extruder 3 was set as follows:

| F | C | | M |
|---|---|---|---|
| 160° C. | 180° C. | 200° C. | 200° C. |

The temperature of gear pump 11 was changed in the range of 65° C. to 160° C. The temperature profiles of the crosshead and the die were evaluated at 170° C. and in the range of 100° to 130° C. The results are summarized in Table 4. A rate of change in molten resin composition temperature is small. However, it is found conditions under which no bubbles are formed can be established by utilizing a cooling capacity (blowing and water cooling).

TABLE 4

Example 3

| | | | | | | |
|---|---|---|---|---|---|---|
| Extruder Temperature | | | | | | |
| F Zone | 160° C. | 160° C. | 160° C. | 160° C. | 160° C. | 160° C. |
| After C Zone | 180° C. | 180° C. | 180° C. | 180° C. | 180° C. | 180° C. |
| Before C Zone | 200° C. | 200° C. | 200° C. | 200° C. | 200° C. | 200° C. |
| M zone | 200° C. | 200° C. | 200° C. | 200° C. | 200° C. | 200° C. |
| Cooling Zone | | | | | | |
| Structure | 10 cc/rev straight gear pump | 10 cc/rev straight gear pump | 10 cc/rev straight gear pump | 10 cc/rev straight gear pump | 10 cc/rev straight gear pump | 10 cc/rev straight gear pump |
| Temperature | 160° C. | 160° C. | 120° C. | 120° C. | 65° C. | 65° C. |
| Crosshead Temperature | 170° C. | 170° C. | 170° C. | 170° C. | 170° C. | 170° C. |
| Die Temperature | 170° C. | 170° C. | 170° C. | 170° C. | 170° C. | 170° C. |
| Screw Speed | 20 rpm | 40 rpm | 20 rpm | 40 rpm | 20 rpm | 40 rpm |
| Molten Resin Temperature | 175° C. | 186° C. | 172° C. | 183° C. | 166° C. | 179° C. |
| Bubble | Many | Many | Little | Many | None | Many |
| Gel Fraction | 71% | 70% | 65% | 68% | 62% | 65% |
| Heat Deformation Coefficient | 19% | 24% | 22% | 25% | 24% | 18% |
| Outer Appearance | Good | Good | Good | Good | Good | Good |
| Extruder Temperature | | | | | | |
| F Zone | 160° C. | 160° C. | 160° C. | 160° C. | 160° C | 160° C. |
| After C Zone | 180° C. | 180° C. | 180° C. | 180° C. | 180° C. | 180° C. |
| Before C Zone | 200° C. | 200° C. | 200° C. | 200° C. | 200° C. | 200° C. |
| M zone | 200° C. | 200° C. | 200° C. | 200° C. | 200° C. | 200° C. |
| Cooling Zone | | | | | | |
| Structure | 10 cc/rev straight gear pump | 10 cc/rev straight gear pump | 10 cc/rev straight gear pump | 10 cc/rev straight gear pump | 10 cc/rev straight gear pump | 10 cc/rev straight gear pump |

TABLE 4-continued

|  | Example 3 | | | | | |
|---|---|---|---|---|---|---|
| Temperature | 160° C. | 160° C. | 120° C. | 120° C. | 65° C. | 65° C. |
| Crosshead Temperature | 130° C. | 130° C. | 130° C. | 130° C. | 130° C. | 130° C. |
| Die Temperature | 130° C. | 130° C. | 130° C. | 130° C. | 130° C. | 130° C. |
| Screw Speed | 20 rpm | 40 rpm | 20 rpm | 40 rpm | 20 rpm | 40 rpm |
| Molten Resin Temperature | 173° C. | 180° C. | 166° C. | 176° C. | 162° C. | 170° C. |
| Bubble | Little | Many | None | Many | None | Little |
| Gel Fraction | 67% | 72% | 64% | 66% | 70% | 69% |
| Heat Deformation Coefficient | 20% | 17% | 20% | 22% | 19% | 17% |
| Outer Appearance | Good | Good | Good | Good | Good | Good |

EXAMPLE 4

Static mixer/stirrer (static mixer having an inner diameter of 30 mm and an L/D of 9) 11 was inserted between extruder 3 and crosshead 6 (see FIG. 1). The temperature profile of extruder 3 was set as follows:

| F | C | | M |
|---|---|---|---|
| 160° C. | 180° C. | 200° C. | 200° C. |

The temperature of static mixer 11 was controlled in the range of 65° to 90° C. The temperature profiles of the crosshead and the die were controlled, as shown in Table 5. Results are shown in Table 5. An L-LDPE (low-pressure low-density polyethylene) based composition can also be used. The mixing ratio of the components such as silanol condensation catalyst is not limited to the level defined in Table 5.

TABLE 5

|  | Example 4 | | | | | | | | | | |
|---|---|---|---|---|---|---|---|---|---|---|---|
| EEA (EA cont. 15%) | 100 PHR |  |  |  |  | 70 PHR | 70 PHR | 70 PHR | 100 PHR | 100 PHR |  |
| High Pressure Low-Density Polyethylene |  | 100 PHR |  |  |  |  |  |  |  |  |  |
| Low-Pressure High-Density Polyethylene |  |  | 100 PHR |  |  | 30" | 30" | 30" |  |  |  |
| Low-Pressure Low-Density Polyethylene |  |  |  | 100 PHR |  |  |  |  |  |  |  |
| EVA (VA cont. 18%) |  |  |  |  | 100 PHR |  |  |  |  |  |  |
| EPDM |  |  |  |  |  | 100 PHR |  |  |  |  |  |
| Magnesium Hydroxide | 50" | 50" | 50" | 50" | 50" | 50" | 15" | 100" | 200" |  |  |
| Red Phosphorus | 7" | 7" | 7" | 7" | 7" | 7" | 7" | 7" | 7" |  |  |
| Antimony Trioxide |  |  |  |  |  |  |  |  |  | 30" |  |
| Decabromodiphenyl Ether |  |  |  |  |  |  |  |  |  | 60" |  |
| Calcium Carbonate |  |  |  |  |  |  |  |  |  |  | 50" |
| Unsaturated Alkoxysilane | 1.8" | 1.8" | 1.8" | 1.8" | 1.8" | 1.8" | 1.8" | 1.8" | 1.8" | 1.8" | 1.8" |
| Organic Peroxide | 0.13" | 0.13" | 0.13" | 0.13" | 0.13" | 0.13" | 0.13" | 0.13" | 0.13" | 0.13" | 0.13" |
| Silanol Condensation Catalyst | 0.05" | 0.05" | 0.05" | 0.05" | 0.05" | 0.05" | 0.05" | 0.05" | 0.05" | 0.05" | 0.05" |
| Antioxidant | 2" | 2" | 2" | 2" | 2" | 2" | 2" | 2" | 2" | 2" | 2" |
| Extruder Temperature |  |  |  |  |  |  |  |  |  |  |  |
| F Zone | 160° C. | 160° C. | 160° C. | 160° C. | 160° C. | 160° C. | 160° C. | 160° C. | 160° C. | 160° C. | 160° C. |
| After C Zone | 180° C. | 180° C. | 180° C. | 180° C. | 180° C. | 180° C. | 180° C. | 180° C. | 180° C. | 180° C. | 180° C. |
| Before C Zone | 200° C. | 200° C. | 200° C. | 200° C. | 200° C. | 200° C. | 200° C. | 200° C. | 200° C. | 200° C. | 200° C. |
| M Zone | 200° C. | 200° C. | 200° C. | 200° C. | 200° C. | 200° C. | 200° C. | 200° C. | 200° C. | 200° C. | 200° C. |
| Static Mixer | 65° C. | 70° C. | 80° C. | 80° C. | 65° C. | 65° C. | 80° C. | 80° C. | 80° C. | 65° C. | 65° C. |
| Crosshead Temperature | 130° C. | 130° C. | 130° C. | 130° C. | 130° C. | 130° C. | 130° C. | 130° C. | 130° C. | 130° C. | 130° C. |
| Die Temperature | 130° C. | 130° C. | 130° C. | 130° C. | 130° C. | 130° C. | 130° C. | 130° C. | 130° C. | 130° C. | 130° C. |
| Screw Speed | 20 rpm | 20 rpm | 20 rpm | 20 rpm | 20 rpm | 20 rpm | 20 rpm | 20 rpm | 20 rpm | 20 rpm | 20 rpm |
| Molten Resin Temperature | 152° C. | 163 | 166 | 165 | 150 | 147 | 158 | 166 | 167 | 156 | 153 |
| Bubble | None | None | None | None | None | None | None | None | None | None | None |
| Gel Fraction | 62% | 60% | 62% | 65% | 62% | 62% | 60% | 63% | 63% | 65% | 65% |
| Heat Deformation Coefficient | 25% | 25% | 19% | 20% | 32% | — | 24% | 20% | 23% | 25% | 26% |
| Outer Appearance | Good | Good | Good | Good | Good | Good | Good | Good | Relatively bad | Good | Good |

As described above, the following effects can be obtained according to the present invention.

(a) Generation of bubbles can be prevented when a composite silane crosslinked composition containing a large amount of a fire retardant or an inorganic filler is extruded according to a silane one-step method.

(b) An existing extruder can be used when it is used together with a static mixer/stirrer, thus reducing installation cost.

(c) A subextruder or a gear group may be used together with the existing extruder.

What is claimed is:

1. A method of manufacturing an extruded product of a fire-retardant crosslinked polyolefin composition using an extruding apparatus said method comprising the steps of:

feeding a composition into said extruder via a hopper, said composition comprising 100 parts by weight of polyolefin resin, 10 to 200 parts by weight of at least one material selected from the group consisting on an inorganic fire retardant, an organic fire retardant, and an inorganic filler, a predetermined amount of a hydrolyzable unsaturated alkoxysilane, a predetermined amount of a radical polymerization initiator, and a predetermined amount of a silanol condensation catalyst;

kneading the composition in said extruder while heating the composition to form a molten resin and to react the composition to form a silicon grafted component;

uniformly cooling the kneaded composition in cooling equipment in a cooling zone to a uniform temperature of from 100° C. to 170° C.;

extruding the composition into a product of a desired shape; and bringing the product into contact with moisture, to crosslink the extruded product.

2. The method of claim 1, wherein a static mixer/stirrer is used as cooling equipment in the cooling zone to cool and stir the molten resin composition so as to control the molten resin composition.

3. The method of claim 1, wherein an extruder is used as cooling equipment in the cooling zone to cool and stir the molten resin composition so as to control the molten resin composition.

4. The method of claim 1 wherein a gear pump is used as cooling equipment in the cooling zone to cool and stir the molten resin composition so as to control the molten resin composition.

5. The method of claim 1, wherein the polyolefin comprises at least one polymer selected from the group consisting of high-pressure low-density polyethylene, medium/low-pressure high-density polyethylene, low-pressure low-density polyethylene, medium-density polyethylene, an ethylene-α-olefin copolymer, polypropylene, an ethylene-ethyl acrylate copolymer, an ethylene-vinyl acetate copolymer, an ethylene-propylene copolymer, an ethylene-propylene-diene terpolymer, an ethylene-butene copolymer, polymethylpentene-1, polybutene, chlorinated polyethylene, and an ethylene-vinyl acetate-chlorine terpolymer.

6. The method of claim 1, wherein the inorganic fire retardant comprises at least one material selected from the group consisting of antimony trioxide, aluminum hydroxide, magnesium hydroxide, zinc borate, red phosphorus, sodium antimonate, ammonium primary phosphate, ammonium secondary phosphate, ammonium bromide, ammonium borate, and ammonium sulfamate.

7. The method of claim 1, wherein the organic film retardant comprises at least one material selected from the group consisting of an alkyl phosphoric ester, a halogen acid-containing ester, an acidic phosphoric ester, a nitrogen-containing phosphoric ester, a polymerizable phosphorus compound monomer and halogen-based organic fire retardant.

8. The method of claim 1, wherein the inorganic filler comprises at least one material selected from the group consisting of silicate minerals, calcium carbonate, and talc.

9. The method of claim 1, wherein the unsaturated alkoxysilane comprises a compound represented by general formula:

$$RR'SiY_2$$

wherein R is an olefinic unsaturated group having a valency of 1 and containing carbon, hydrogen and oxygen atoms, group Y is any hydrolyzable organic group, and group R' is a hydrocarbon group having a valency of 1 and not containing an unsaturated aliphatic group.

10. The method of claim 9, wherein the unsaturated alkoxysilane comprises one material selected from the group consisting of vinyltrimethoxysilane and vinyltriethoxysilane.

11. The method of claim 1, wherein the radical polymerization initiator comprises a compound capable of forming radicals in the polyolefin under reactive conditions and having a half-life of not more than 6 minutes at a reaction temperature.

12. The method of claim 11, wherein the radical polymerization initiator comprises a material selected from the group consisting of an organic peroxide, a perester and an azo compound.

13. The method of claim 1, wherein the silanol condensation catalyst comprises a compound selected from the group consisting of a metal salt of carboxylic acid, an organic metal compound, an organic base, a mineral acid, and a fatty acid.

* * * * *